US008494757B2

(12) United States Patent
Haskara et al.

(10) Patent No.: US 8,494,757 B2
(45) Date of Patent: Jul. 23, 2013

(54) METHOD FOR ESTIMATING AND CONTROLLING ACCOUSTIC NOISE DURING COMBUSTION

(75) Inventors: Ibrahim Haskara, Macomb, MI (US); Yue-Yun Wang, Troy, MI (US); Chol-Bum M. Kweon, Bel Air, MD (US); Frederic Anton Matekunas, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 534 days.

(21) Appl. No.: 12/858,043

(22) Filed: Aug. 17, 2010

(65) Prior Publication Data

US 2012/0046847 A1 Feb. 23, 2012

(51) Int. Cl.

| | |
|---|---|
| ***G06F 19/00*** | (2006.01) |
| ***G01L 23/00*** | (2006.01) |
| ***G01M 15/05*** | (2006.01) |
| ***F02D 41/40*** | (2006.01) |

(52) U.S. Cl.
USPC ........... 701/111; 701/104; 701/105; 701/108; 123/435; 702/190

(58) Field of Classification Search
USPC ............. 123/406.22, 406.26, 406.34, 406.37, 123/406.38, 406.41, 406.45, 406.47, 435, 123/478, 480, 568.21; 701/102–105, 108, 701/109, 111, 114, 115; 73/35.12, 114.02, 73/114.16; 702/182, 183, 189, 190
See application file for complete search history.

(56) References Cited

U.S. PATENT DOCUMENTS

| | | | | |
|---|---|---|---|---|
| 5,445,517 | A * | 8/1995 | Kondou et al. | 431/18 |
| 5,485,380 | A * | 1/1996 | Takasuka et al. | 701/34.1 |
| 5,594,649 | A * | 1/1997 | Cook et al. | 701/29.2 |
| 5,663,493 | A * | 9/1997 | Gerbert et al. | 73/114.23 |
| 7,856,308 | B2 * | 12/2010 | Inada et al. | 701/111 |
| 8,122,868 | B2 * | 2/2012 | Zavala Jurado et al. | 123/406.26 |

OTHER PUBLICATIONS

Jose M. Desantes, Wavelet Transform applied to Combustion NOise Analysis in High-speed Di Diesel Engines, SAE, Apr. 2001, p. 1-11, vol. 2001-01-1545, SAE International, USA.
Felice E. Corcione, Analysis of Control of NOise Emissions of a Small Single Cylinder D.I. Diesel Engine, SAE, May 5, 2003, p. 1-9, vol. 2003-01-1459, Warrendale, PA.
Wang, Optimization of Combustion NOise of MOdern Diesel Engines for Passenger Cars, SAE, May 15, 2007, p. 1-10, vol. 2007-01-2379, Warrendale, PA.
Payri, New methodology for in-cylinder pressure analysis in direct injection diesel engines—application to combustion noise, Meas. Sci. Technol., Jan. 21, 2006, p. 540-58 vol. 16(2005), Institute of Physics Publishing, Valencia, Spain.
Christensen, A Wavelet-Based Combustion Noise Meter, International Conference on Control Applications, Oct. 4, 2006, pp. 533-38, vol. WeB05.5, Munich, Germany.

* cited by examiner

*Primary Examiner* — Willis R Wolfe, Jr.

(57) ABSTRACT

A method for controlling combustion in a direct injection internal combustion engine operable in a lean combustion mode includes monitoring in-cylinder pressure, utilizing a time-based filter to calculate an actual combustion noise based upon the monitored in-cylinder pressure, monitoring combustion control parameters utilized by the engine, determining an expected combustion noise based upon the monitored combustion control parameters, comparing the actual combustion noise to the expected combustion noise, and adjusting the combustion control parameters based upon the comparing.

17 Claims, 4 Drawing Sheets

METHOD FOR ESTIMATING AND CONTROLLING ACCOUSTIC NOISE DURING COMBUSTION

TECHNICAL FIELD

This disclosure is related to advanced diesel combustion.

BACKGROUND

The statements in this section merely provide background information related to the present disclosure and may not constitute prior art.

Advanced diesel combustion modes employing high exhaust gas recirculation (EGR) rates and advanced injection strategies may be utilized for meeting emission regulations. Advanced injection strategies can include premixed charge compression ignition (PCCI) and homogeneous charge compression ignition (HCCI). Advanced diesel combustion modes can further include limited temperature combustion (LTC). It is understood that premixed combustion noise can reach unacceptable levels in the presence of high EGR rates and injection inaccuracy.

It is known, for example, to impose limits for air and/or fuel during base engine calibration to control engine noise. However, these limits are inherently conservative and sacrifice efficiency. Further, it is known to utilize analog combustion noise meters and/or dedicated combustion analysis tools during combustion calibration to compute acoustic combustion noise measures based on frequency spectrum analysis of in-cylinder pressure measurements. Although combustion noise meters and analysis tools can be useful during engine calibration, they may not be practically directly usable for on-board vehicle applications for real-time closed-loop control due, for example, to hardware cost or computational throughput requirements

SUMMARY

A method for controlling combustion in a direct injection internal combustion engine operable in a lean combustion mode includes monitoring in-cylinder pressure, utilizing a time-based filter to calculate an actual combustion noise based upon the monitored in-cylinder pressure, monitoring combustion control parameters utilized by the engine, determining an expected combustion noise based upon the monitored combustion control parameters, comparing the actual combustion noise to the expected combustion noise, and adjusting the combustion control parameters based upon the comparing.

BRIEF DESCRIPTION OF THE DRAWINGS

One or more embodiments will now be described, by way of example, with reference to the accompanying drawings, in which.

DETAILED DESCRIPTION

Figure 1:
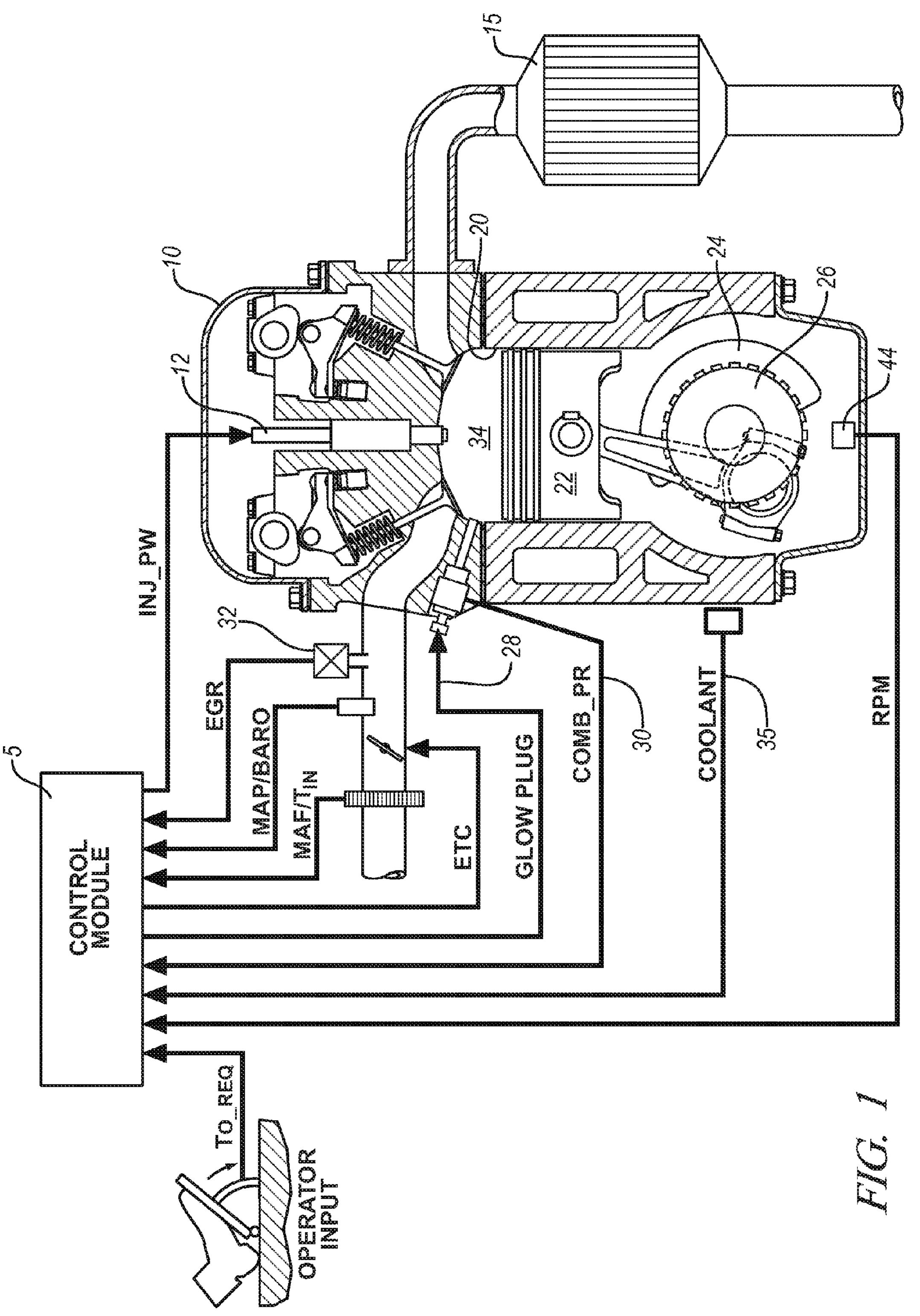
FIG. 1 is a sectional view of an internal combustion engine configured in accordance with the present disclosure.

Referring now to the drawings, wherein the showings are for the purpose of illustrating certain exemplary embodiments only and not for the purpose of limiting the same, FIG. 1 is a schematic diagram depicting an exemplary internal combustion engine 10, control module 5, and exhaust aftertreatment system 15, constructed in accordance with an embodiment of the disclosure. The exemplary engine comprises a multi-cylinder, direct-injection, compression-ignition internal combustion engine having reciprocating pistons 22 attached to a crankshaft 24 and movable in cylinders 20 which define variable volume combustion chambers 34. The crankshaft 24 is operably attached to a vehicle transmission and driveline to deliver tractive torque thereto, in response to an operator torque request ($T_{O\_REQ}$). The engine preferably employs a four-stroke operation wherein each engine combustion cycle comprises 720 degrees of angular rotation of crankshaft 24 divided into four 180-degree stages (intake-compression-expansion-exhaust), which are descriptive of reciprocating movement of the piston 22 in the engine cylinder 20. A multi-tooth target wheel 26 is attached to the crankshaft and rotates therewith. The engine includes sensing devices to monitor engine operation, and actuators which control engine operation. The sensing devices and actuators are signally or operatively connected to control module 5.

The engine preferably comprises a direct-injection, four-stroke, internal combustion engine including a variable volume combustion chamber defined by the piston reciprocating within the cylinder between top-dead-center and bottom-dead-center points and a cylinder head comprising an intake valve and an exhaust valve. The piston reciprocates in repetitive cycles each cycle comprising intake, compression, expansion, and exhaust strokes.

The engine preferably has an air/fuel operating regime that is primarily lean of stoichiometry. One having ordinary skill in the art understands that aspects of the disclosure are applicable to other engine configurations that operate primarily lean of stoichiometry, e.g., lean-burn spark-ignition engines. During normal operation of the compression-ignition engine, a combustion event occurs during each engine cycle when a fuel charge is injected into the combustion chamber to form, with the intake air, the cylinder charge. The charge is subsequently combusted by action of compression thereof during the compression stroke.

The engine is adapted to operate over a broad range of temperatures, cylinder charge (air, fuel, and EGR) and injection events. The methods described herein are particularly suited to operation with direct-injection compression-ignition engines operating lean of stoichiometry to determine parameters which correlate to heat release in each of the combustion chambers during ongoing operation. The methods are further applicable to other engine configurations, including spark-ignition engines, including those adapted to use homogeneous charge compression ignition (HCCI) strategies. The methods are applicable to systems utilizing multiple fuel injection events per cylinder per engine cycle, e.g., a system employing a pilot injection for fuel reforming, a main injection event for engine power, and, where applicable, a post-combustion fuel injection event for aftertreatment management, each which affects cylinder pressure.

Sensing devices are installed on or near the engine to monitor physical characteristics and generate signals which are correlatable to engine and ambient parameters. The sensing devices include a crankshaft rotation sensor, including a crank sensor 44 for monitoring crankshaft speed through sensing edges on the teeth of the multi-tooth target wheel 26. The crank sensor is known, and may include, e.g., a Hall-effect sensor, an inductive sensor, or a magnetoresistive sensor. Signal output from the crank sensor 44 (RPM) is input to the control module 5. There is a combustion pressure sensor 30, including a pressure sensing device adapted to monitor in-cylinder pressure (COMB_PR). The combustion pressure sensor 30 preferably includes a non-intrusive device comprising a force transducer having an annular cross-section that is adapted to be installed into the cylinder head at an opening for a glow-plug 28. The combustion pressure sensor 30 is installed in conjunction with the glow-plug 28, with combustion pressure mechanically transmitted through the glow-plug to the sensor 30. The output signal, COMB_PR, of the sensing element of sensor 30 is proportional to cylinder pressure. The sensing element of sensor 30 includes a piezoceramic or other device adaptable as such. Other sensing devices preferably include a manifold pressure sensor for monitoring manifold pressure (MAP) and ambient barometric pressure (BARO), a mass air flow sensor for monitoring intake mass air flow (MAF) and intake air temperature ($T_{IN}$), and a coolant sensor 35 (COOLANT). The system may include an exhaust gas sensor for monitoring states of one or more exhaust gas parameters, e.g., temperature, air/fuel ratio, and constituents. One skilled in the art understands that there may be other sensing devices and methods for purposes of control and diagnostics. The operator input, in the form of the operator torque request, To_REQ, is typically obtained through a throttle pedal and a brake pedal, among other devices. The engine is preferably equipped with other sensors for monitoring operation and for purposes of system control. Each of the sensing devices is signally connected to the control module 5 to provide signal information which is transformed by the control module to information representative of the respective monitored parameter. It is understood that this configuration is illustrative, not restrictive, including the various sensing devices being replaceable with functionally equivalent devices and algorithms.

The actuators are installed on the engine and controlled by the control module 5 in response to operator inputs to achieve various performance goals. Actuators include an electronically-controlled throttle device which controls throttle opening to a commanded input (ETC), and a plurality of fuel injectors 12 for directly injecting fuel into each of the combustion chambers in response to a commanded input (INJ_PW), all of which are controlled in response to the operator torque request, To_REQ. There is an exhaust gas recirculation valve 32 and cooler, which controls flow of externally recirculated exhaust gas to the engine intake, in response to a control signal (EGR) from the control module. The glow-plug 28 includes a known device, installed in each of the combustion chambers, adapted for use with the combustion pressure sensor 30.

The fuel injector 12 is an element of a fuel injection system, which includes a plurality of high-pressure fuel injector devices each adapted to directly inject a fuel charge, including a mass of fuel, into one of the combustion chambers in response to the command signal, INJ_PW, from the control module. Each of the fuel injectors 12 is supplied pressurized fuel from a fuel distribution system, and have operating characteristics including a minimum pulsewidth and an associated minimum controllable fuel flow rate, and a maximum fuel flowrate.

The engine may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 5 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters. The control module 5 is configured to receive input signals from an operator (e.g., via an accelerator pedal and a brake pedal) to determine the operator torque request, To_REQ. Additionally, the control module 5 monitors the sensors indicating the engine speed and intake air temperature, and coolant temperature and other ambient conditions.

The control module 5 executes algorithmic code stored therein to control the aforementioned actuators to control engine operation, including throttle position, fuel injection mass and timing, EGR valve position to control flow of recirculated exhaust gases, glow-plug operation, and control of intake and/or exhaust valve timing, phasing, and lift on systems so equipped. The control module is configured to receive input signals from the operator (e.g., a throttle pedal position and a brake pedal position) to determine the operator torque request, To_REQ, and from the sensors indicating the engine speed (RPM) and intake air temperature (Tin), and coolant temperature and other ambient conditions.

The operation of engine 10 can take many forms, as described above, with different air/fuel ratios, injector timings, valve timings and settings, EGR %, and other combustion control parameters affecting the resulting combustion. However, it will be appreciated that combustion is a complex process, and a number of factors can affect the actual output of the engine resulting from the combustion. As a result, operation in combustion schemes requiring fine control of the resulting combustion process cannot always be adequately controlled by just monitoring the controlled inputs to the combustion process. As described above, combustion noise level can change based upon a number of factors including unexpected changes to EGR % and injection timing error. A set of combustion parameters can be commanded through control module 5, leading to an anticipated combustion noise level, but factors affecting combustion noise level not captured in the commanded combustion parameters can cause an undesirable increase in the combustion noise level. However, in-cylinder pressure measurements can monitor the actual results of the combustion process including the factors that affect combustion noise level. By monitoring pressure measurements and calculating or estimating a noise level based upon the pressure measurements, one can compare the calculated noise levels to expected or threshold noise levels and control the engine based upon the comparison.

Figure 2:
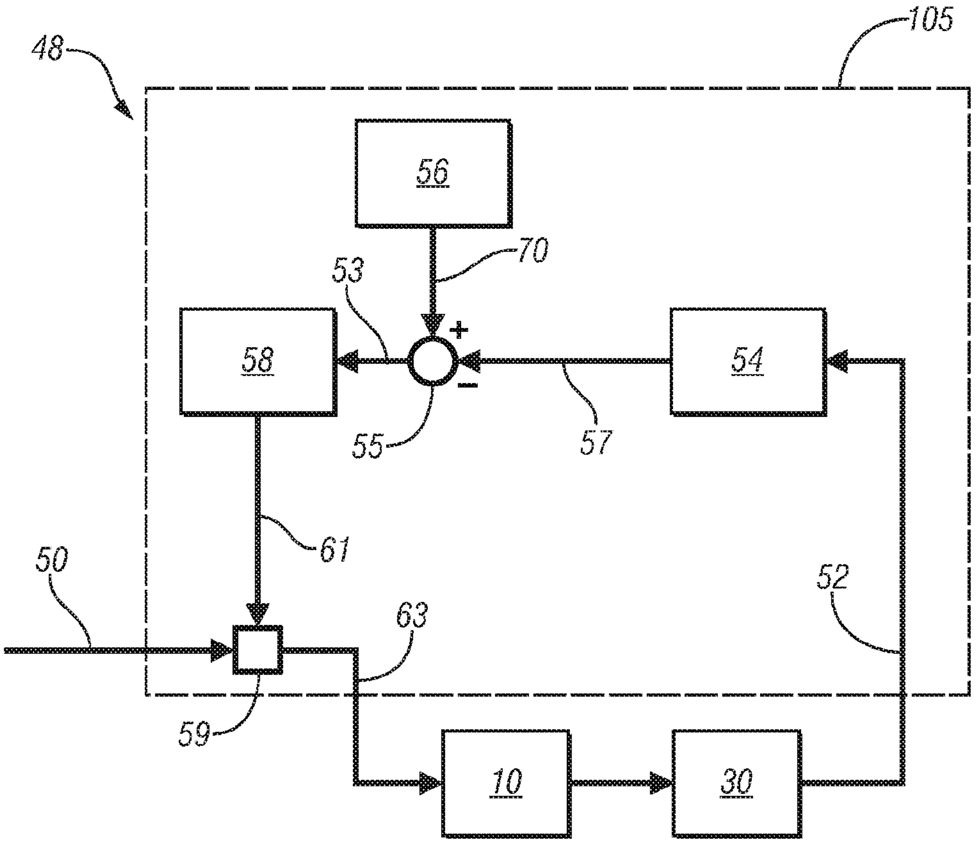
FIG. 2 is a schematic drawing of a combustion noise system providing on-board estimation of combustion noise, based on in-cylinder pressure trace measurements, for real-time combustion control and diagnostics in accordance with the present disclosure.

Referring now to FIG. 2, a combustion noise system 48 is illustrated in accordance with an exemplary embodiment of the present disclosure. As will become apparent, the combustion noise system 48 provides on-board estimation of combustion noise, based on in-cylinder pressure trace measurements, for real-time combustion control and diagnostics. Specifically, noise indicators can be extracted from an in-cylinder pressure trace. Noise indicators can include a maximum pressure rise rate and ringing intensity. The ringing intensity having a reasonable correlation to a radiated sound level caused by combustion during specific ranges. The combustion noise system 48 includes a compensation module 105, unmodified combustion control parameters 50, a combustion module 59, the engine 10, the combustion sensor 30, a combustion noise level (CNL) estimation process 54, a difference unit 55, a combustion control parameters unit 56, and a combustion correction feedback unit 58. It is appreciated that the unmodified combustion control parameters 50 are based on desired engine operation, for example, the operator torque request, $T_{O\_REQ}$, wherein $T_{O\_REQ}$ can include operator inputs to actuators including an accelerator pedal and a brake pedal, as mentioned above. It is further appreciated that the compensation module 105 is associated with the control module 5.

Referring to FIGS. 1 and 2, the unmodified combustion control parameters 50 are input to the compensation module 105 and monitored, wherein the unmodified combustion control parameters 50 convey information relating to an appropriate combustion mode for the engine 10 to operate. As discussed above, combustion modes of the engine can include diesel and advanced diesel combustion. The unmodified combustion control parameters 50 and adjustments to combustion control parameters 61 are input to the combustion module 59, wherein the compensation module 105 controls the aforementioned actuators to form compensated combustion control parameters 63 to the engine 10. The compensated combustion control parameters 63 can include fuel injection timing, air/fuel ratio, rail pressure, valve timing control and EGR mass flow rate operative for the appropriate combustion mode of the engine 10, while maintaining target combustion noise levels for combustion in real-time. In an exemplary embodiment of the present disclosure, monitored in-cylinder combustion pressure ($P(\theta)_{MON}$) 52 is measured by the combustion sensor 30. It is appreciated that θ corresponds to the crank angle of the combustion cycle. Thereafter, $P(\theta)_{MON}$ 52 is input to—and monitored by—the compensation module 105, wherein $P(\theta)_{MON}$ 52 is utilized with a time-based filter of the CNL estimation process 54 to estimate an acoustic actual CNL output 57. It will become apparent that utilizing the time-based filter to process $P(\theta)_{MON}$ 52, and thereby estimate the actual CNL output 57, is operative for real-time on-board combustion control.

It is known that engines operating in a lean combustion mode are scheduled based on engine speed and load, wherein the unmodified combustion control parameters 50 and the compensated combustion control parameters 63 vary according to the engine speed and load at which the engine is operating. Therefore, in-cylinder combustion pressure will vary according to the engine speed and load. Utilizing the CNL estimation algorithm 54 to estimate the actual CNL output 57 enables real-time onboard combustion noise estimation for each combustion cycle based upon measured in-cylinder pressure traces from each engine cycle to identify what combustion control parameters 50 are causing unacceptable combustion noise based on the engine speed and load.

Figure 3:
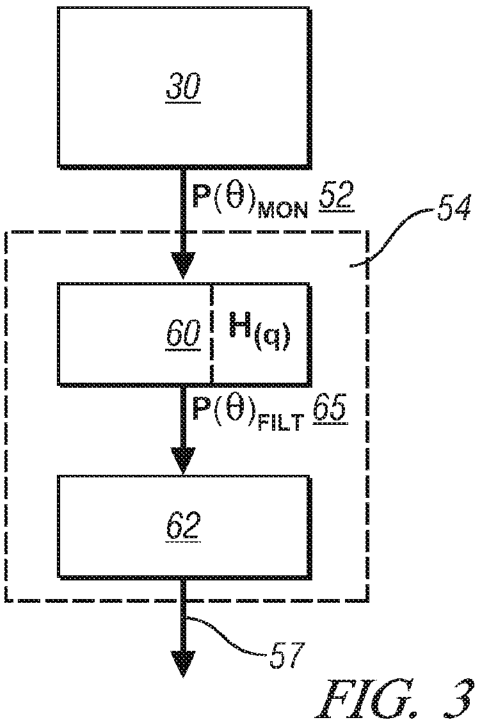
FIG. 3 is a detailed view of step 54 of the combustion noise system of FIG. 2 in accordance with the present disclosure.

In accordance with an exemplary embodiment of the present disclosure, FIG. 3 illustrates the CNL estimation process 54 in further detail. The CNL estimation process 54 utilizes the time-based filter in step 60 and a CNL equation in step 62 to estimate the actual CNL output 57 based upon $P(\theta)_{MON}$ 52.

Referring to step 60, the time-based filter is utilized to process $P(\theta)_{MON}$ 52, wherein a filtered in-cylinder combustion pressure $P(\theta)_{FILT}$ 65 signal is determined. The time-based filter includes computations to apply engine structural attenuation and aural hearing responses to $P(\theta)_{MON}$ 52 input, such that $P(\theta)_{FILT}$ 65 signal represents a likely response of the engine to the pressure conditions within the cylinder represented by $P(\theta)_{MON}$ 52 input. Hence, the time-based filter utilizing engine structural attenuation and aural hearing responses facilitates a relation between in-cylinder pressure level and radiated sound level. Therefore, in-cylinder pressure is associated with the noise attributed to a combustion event and the radiated sound level is what is actually heard in terms of the unit decibel (dB). The time-based filter in step 60 is associated with a discrete-time transfer function (H(q)), wherein q represents a unit delay operator. The H(q) is utilized to capture frequency responses between in-cylinder pressure and a radiated sound level associated with a test engine. Likewise, the H(q) can capture the frequency responses between a range of in-cylinder pressure traces and radiated sound levels associated with the test engine. The frequency responses between the range of in-cylinder pressure traces and the radiated sound levels associated with the test engine can be obtained by a combustion noise meter, wherein the frequency responses correspond to—and are associated with—engine structural attenuation and aural hearing. Time-based filter coefficients associated with the time-based filter, and discussed in further detail below, are utilized to operate the time-based filter such that engine structural attenuation and aural hearing responses are applied to $P(\theta)_{MON}$ 52 to thereby determine the $P(\theta)_{FILT}$ 65. The H(q) is utilized to replicate frequency responses associated with structural attenuation and aural hearing from the test engine to match frequency responses provided by $P(\theta)_{MON}$ 52 to thereby determine the $P(\theta)_{FILT}$ 65. The computations including use of the H(q) in step 60 can be utilized through look-up tables, access of functional relationships in a memory device, or by other methods known in the art.

In an exemplary embodiment of the present disclosure, the time-based filter is a finite impulse response (FIR) filter, wherein the $P(\theta_k)_{FILT}$ can be calculated in real time by the following convolution equation:

$$P(\theta_k)_{FILT}=\Sigma_{i=0}^{n}P(\theta_{k-i})*W(i) \quad [1]$$

wherein

P is the pressure trace from a cycle,

θ is the crank angle, and k-i is the index for the crank angle.

It will be appreciated that the $P(\theta)_{FILT}$ 65 is also a trace of the same size over the crank angle. W(i) represents a variable time-based filter coefficient used in the on-board determination of the $P(\theta)_{FILT}$ 65 conforming the operation of the filter to the measured aural hearing response of the engine to the particular condition of the test engine. Values of W(i) are obtained by computing the finite impulse response of the filter specified in a desired frequency response between the in-cylinder pressure level and the radiated sound level associated with the test engine shown in FIG. 4 below. Hence, determining values of W(i) aide in replicating the measured frequency responses of the test engine to thereby determine $P(\theta)_{FILT}$ 65. Likewise, n corresponds to the number of W(i) values. It will be appreciated that the value of n is a design parameter for adjusting the accuracy of the FIR filter to match $P(\theta_k)_{FILT}$ a desired frequency response.

Once $P(\theta)_{FILT}$ 65 representing the likely response of the engine to $P(\theta)_{MON}$ 52 has been determined, a CNL can be estimated based upon $P(\theta)_{FILT}$ 65. It is appreciated that the $P(\theta)_{FILT}$ 65 is a band-pass filtered trace of $P(\theta)_{MON}$ 52. Step 62 determines an actual CNL output 57 based upon $P(\theta)_{FILT}$ 65. In an exemplary operation of step 62, a power ($P_{filt,RMS}$) of the $P(\theta)_{FILT}$ 65 is scaled relative to an audible limit ($P_a$) in terms of dB. The $P_a$ can be determined by calibration, modeling, or any other method sufficient to estimate operation of the engine and the resulting CNL, and a multitude of operations or functional relationships to estimate CNL can be determined and utilized for different engine operating conditions. In other words, the $P_a$ functions as a threshold for a dB level at which a radiated sound level can actually be heard. An exemplary actual CNL output 57 can be calculated by the following equation:

$$CNL = 10 * \log\frac{P_{filt,RMS}}{P_a^2} \quad [2]$$

Eq. 2 determines the actual CNL output 57, where it should be appreciated that the actual CNL output 57 is the estimated combustion noise based upon $P(\theta)_{MON}$ 52 used to determine the $P(\theta)_{FILT}$ 65. Although the CNL output 57 is based upon a structural attenuation approach utilizing frequency responses, the time based filter, e.g., the FIR filter, allows for estimated combustion noise in real-time and, thus, can be implemented on-board.

Figure 4:
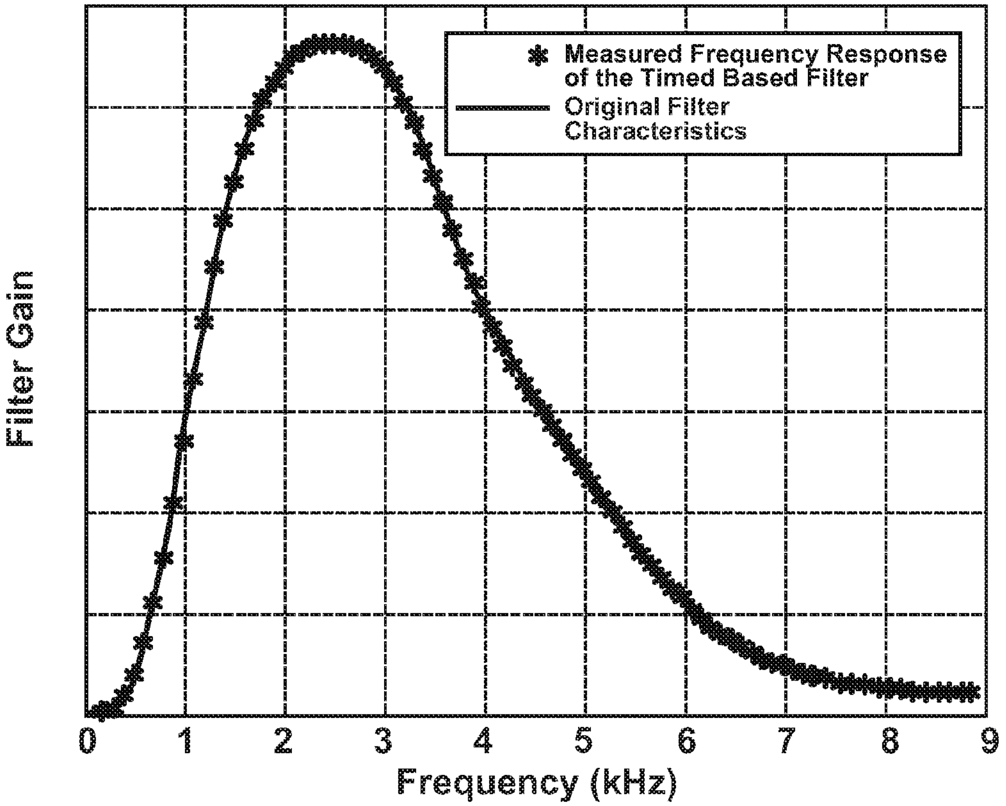
FIG. 4 is a graph illustrating a desired filter frequency response between an in-cylinder pressure level and a radiated sound level in accordance with the present disclosure.

FIG. 4 illustrates a graphical representation of a desired filter frequency response between an in-cylinder pressure level and a radiated sound level associated with the exemplary results shown in step 60 of FIG. 3 utilizing the operatively tuned H(q), in accordance with the present disclosure. It will be appreciated that the desired filter frequency response is illustrated as the solid line and corresponds to the original filter characteristics. The time-based filter is designed in a manner such that the frequency response measured by the time-based filter is substantially equivalent to the desired frequency response of the test engine, e.g., measured by the analog combustion noise meter. It is appreciated that the desired filter frequency response identifies the filter characteristics where default frequency response curves can be utilized for a generic structural attenuation. Likewise, specific frequency response curves having a structural attenuation dependent upon engine type can be utilized. This graphical representation can be used for validation of the time-based filter. The axis of abscissa represents frequency (kHz) and the axis of ordinate represents filter gain. It should be appreciated that the frequency responses of the test engine are measured at an equivalent engine operating point to the point at which $P(\theta)_{MON}$ 52 is obtained from the combustion sensor 30. Comparison of the plots reveals that the frequency response of the exemplary time-based filter accurately represents the desired frequency response of the time-based filter as shown by the solid line shown in FIG. 4. It is appreciated that because the CNL output 57 of the engine 10 is the scaled power of the $P(\theta_k)_{FILT}$, the time-based filter can estimate the actual combustion noise.

Figure 5:
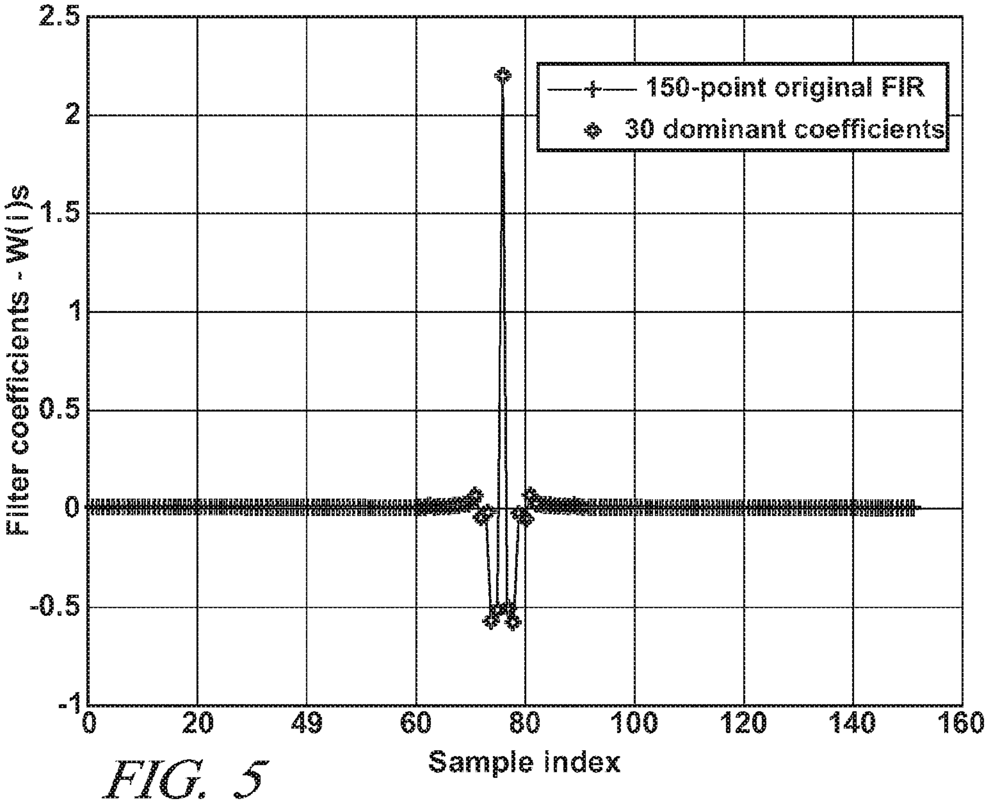
FIG. 5 is a graph depicting computed coefficients for a finite impulse response filter corresponding to the frequency responses that are utilized in the calculation of filtered in-cylinder pressure in accordance with the present disclosure.

FIG. 5 illustrates a graph depicting computed values of W(i) for a FIR filter (i.e., the time based filter in step 60 of FIG. 3) corresponding to the frequency responses that are utilized in the calculation of $P(\theta)_{FILT}$ 65 by Eq. 1 in accordance with the present disclosure. Specifically, computing the finite impulse response of the time-based filter to obtain values of W(i) requires calculating the inverse Fourier transform of the desired frequency response (i.e., the original filter characteristics illustrated in FIG. 4 above). The axis of abscissa represents a sample index and the axis of ordinate represents values of W(i). The design of the FIR filter should utilize a sufficient number of W(i) values for accuracy while taking into consideration computational throughput. As shown in the population graph, a sample index of 150 W(i) values and a sample index of 30 dominant W(i) values are illustrated for the FIR filter. The 30 dominant W(i) values can be utilized in the accurate calculation of $P(\theta)_{FILT}$ 65 by Eq. 1 while achieving low computational throughput.

Figure 6:
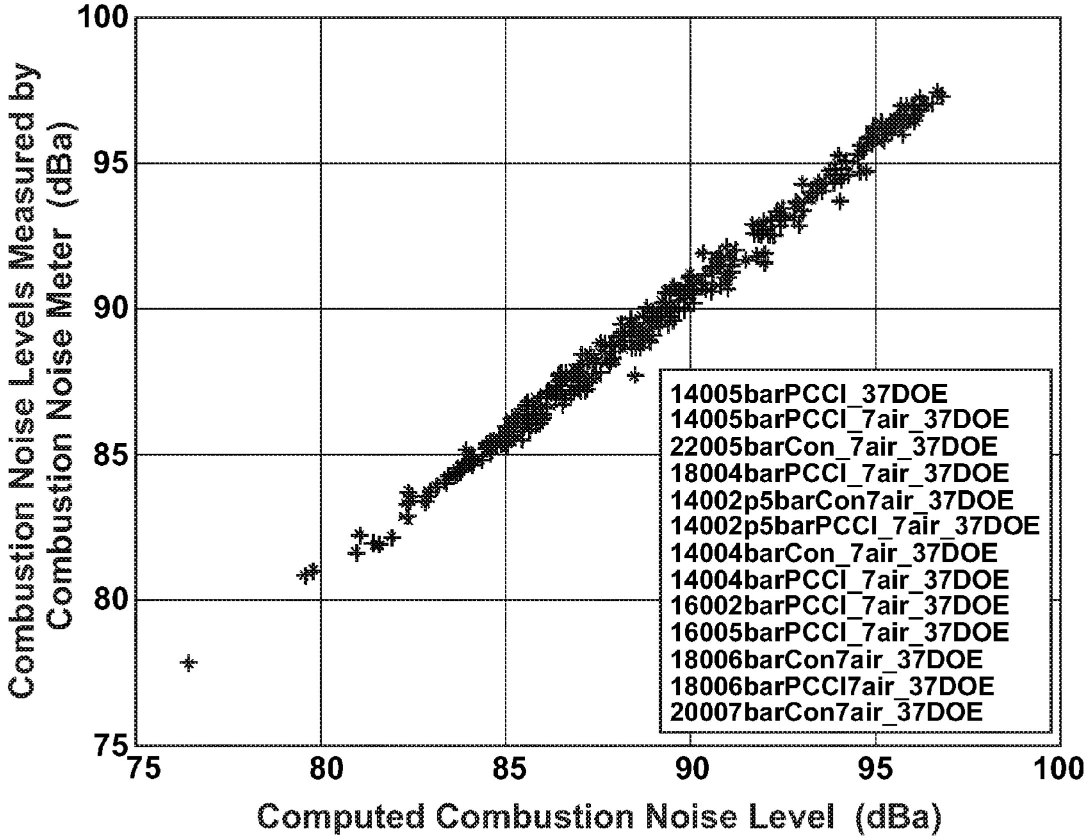
FIG. 6 is a graph illustrating validation of computed combustion noise levels of step 54 shown in FIG. 2 compared to radiated sound levels measured by a combustion noise meter during engine calibration in accordance with the present disclosure.

Referring to FIG. 6, an exemplary validation of the actual CNL output 57 of the CNL estimation process 54 and combustion noise levels measured by the combustion noise meter are plotted. The axis of abscissa represents computed combustion noise levels (i.e., actual CNL output 57 of FIGS. 2 and 3) at varied engine operating points. The axis of ordinate represents corresponding noise levels measured by the combustion noise meter. Comparison of the plots reveals that the actual CNL output 57 accurately reveals the noise level measured by the combustion noise meter.

Referring back to the combustion noise system 48 in FIG. 2, the actual CNL output 57, based on $P(\theta)_{MON}$ 52, and determined by the CNL estimation algorithm 54, is input to the differencing unit 55 and compared with a CNL expected 70 generated by the combustion control parameters unit 56. The combustion control parameters unit 56 determines operating point dependent noise targets for combustion based upon the unmodified combustion control parameters 50, wherein the generated CNL expected 70 is utilized as a threshold to judge excessive combustion noise. Based on the comparing between the CNL expected 70 and the actual CNL output 57, a CNL compared 53 is input the combustion correction feedback unit 58. The combustion correction feedback unit 58 analyzes the CNL compared 53 to thereby generate adjustments to combustion control parameters 61. The adjustments to combustion control parameters 61 are input to the combustion module 59. The adjustments to combustion control parameters 61 are utilized in association with the unmodified combustion control parameters 50 for generation of the compensated combustion control parameters 63 input to the engine 10 for combustion of the subsequent engine combustion cycle. It should be appreciated that the adjustments to control parameters 61 are utilized as a feedback control to the unmodified combustion control parameters 50 for each engine 10 combustion cycle. Hence, $P(\theta)_{MON}$ 52 is continuously obtained and filtered utilizing a time-based filter during each combustion cycle, wherein the actual CNL output 57 is estimated. The actual CNL output 57 is compared to the CNL expected 70 and input to the correction feedback unit 58 to thereby generate the adjustments to combustion control parameters 61 to be input to the combustion module 59 as feedback control for subsequent engine 10 combustion cycles.

Furthermore, a person having ordinary skill in the art appreciates that engines operating in a lean combustion mode are scheduled based on engine speed and load, wherein the compensated combustion control parameters 63 vary according to the engine speed and load at which the engine is operating. Therefore, in-cylinder combustion pressure will vary according to the engine speed and load. Utilizing the CNL estimation algorithm 54 to estimate the actual CNL output 57 enables real-time onboard combustion noise estimation for each combustion cycle based upon measured in-cylinder pressure traces from each cycle.

Embodiments envisioned include calibrating the engine for desired combustion noise levels for each speed and load point utilizing a map in terms of engine speed and load. During vehicle operation, target combustion noise levels can be determined from the map depending upon the engine speed and load, wherein the actual combustion noise can be estimated using the monitored in-cylinder pressure traces with the CNL estimation algorithm 54 discussed herein. Further embodiments envisioned include monitoring in-cylinder pressure traces for each individual cylinder. Estimating the combustion noise on a cylinder by cylinder basis allows for the ability to pinpoint a particular cylinder with a noisy operation and adjusting the combustion control parameters accordingly. Estimating combustion noise during on-board application can enable a less conservative calibration.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling combustion in a direct injection internal combustion engine operable in a lean combustion mode, the method comprising:
- monitoring in-cylinder pressure;
- utilizing a time-based filter to calculate an actual combustion noise based upon the monitored in-cylinder pressure;
- monitoring combustion control parameters utilized by the engine;
- determining an expected combustion noise based upon the monitored combustion control parameters;
- comparing the actual combustion noise to the expected combustion noise; and
- adjusting the combustion control parameters based upon the comparing.

2. The method of claim 1, wherein the time-based filter comprises a finite impulse response filter.

3. The method of claim 1, wherein the time-based filter comprises a discrete-time transfer function comprising time-based filter coefficients based on a desired frequency response from the engine.

4. The method of claim 3, wherein the desired frequency response corresponds to a frequency response associated with engine structural attenuation and aural hearing.

5. The method of claim 4, wherein the frequency response associated with engine structural attenuation and aural hearing comprises a specific frequency response having a structural attenuation and aural hearing dependent upon engine configuration.

6. The method of claim 4, wherein the frequency response associated with engine structural attenuation and aural hearing comprises a default frequency response having a generic structural attenuation and aural hearing.

7. The method of claim 1, wherein the expected combustion noise is utilized as a threshold to judge excessive combustion noise.

8. The method of claim 1, wherein utilizing the time-based filter to calculate the actual combustion noise based upon the monitored in-cylinder pressure comprises:
- determining a band-pass filtered trace of the monitored in-cylinder pressure; and
- calculating the actual combustion noise based upon the band-pass filtered trace.

9. The method of claim 1, wherein adjusting the combustion control parameters based upon the comparing comprises adjusting a fuel injection timing, a fuel injection quantity, an air/fuel ratio, and an EGR mass flow rate.

10. Method for controlling combustion in a direct injection internal combustion engine operable in a lean combustion mode, the method comprising:
- monitoring in-cylinder pressure;
- utilizing a finite impulse response filter to calculate an actual combustion noise based upon the monitored in-cylinder pressures;
- monitoring combustion control parameters comprising an operator torque request;
- determining an expected combustion noise based upon the monitored combustion control parameters;
- comparing the actual combustion noise to the expected combustion noise; and
- adjusting in a subsequent engine combustion cycle based upon the comparing at least one of a fuel injection timing, a fuel rail pressure, an injected fuel quantity, a valve timing, an air-fuel ratio, and an EGR mass flow rate.

11. The method of claim 10, the finite impulse response filter comprises a discrete-time transfer function comprising time-based filter coefficients based on a desired frequency response from the engine.

12. The method of claim 11 wherein the desired frequency response corresponds to a frequency response associated with engine structural attenuation and aural hearing.

13. The method of claim 10, wherein the operator torque request comprises accelerator pedal and brake pedal inputs.

14. The method of claim 10, wherein said engine is a homogeneous charge compression ignition engine.

15. The method of claim 10, wherein said engine is a premixed charge compression ignition engine.

16. The method of claim 10, wherein said engine is a stratified charge compression ignition engine.

17. Apparatus for controlling combustion in a direct injection internal combustion engine operable in a lean combustion mode, the apparatus comprising:
- a pressure sensor monitoring in-cylinder pressure; and
- a control module:
  - utilizing a time-based filter to calculate an actual combustion noise based upon in-cylinder pressure;
  - monitoring combustion control parameters utilized by the engine;

determining an expected combustion noise based upon the monitored combustion control parameters;

comparing the actual combustion noise to the expected combustion noise; and adjusting the combustion control parameters based upon the comparing.

* * * * *